United States Patent Office 3,326,221
Patented June 20, 1967

3,326,221
FILTER
Robert J. Huffman and Carl G. Corrello, Charlotte, N.C., assignors to Celanese Corporation, a corporation of Delaware
No Drawing. Continuation of abandoned application Ser. No. 329,241, Dec. 9, 1963. This application July 19, 1966, Ser. No. 566,389
1 Claim. (Cl. 131—267)

This application is a continuation of application Ser. No. 329,241, filed Dec. 9, 1963, now abandoned.

This invention relates to tobacco smoke filtering material and like products wherein chemical additives are combined with filamentary materials to form a filament filter.

It has been known to use a number of filamentary materials in various forms, such as plugs, wads, etc., for the filtration of tobacco smoke. The object is to remove objectionable and undesirable constituents present in the smoke. Among the constituents which might be removed by these methods are nicotine and volatilized tars. As additional knowledge is gained as to constituents of the smoke which may be distasteful and/or detrimental to health, increasing attention is being given to the preferential absorbency of filters for specific individual smoke constituents. Among such specific compounds which have been noted as undesirable are nicotine, nornicotine, benzo (a)pyrene, arsenic (III)oxide, a number of aldehydes and ketones, isoprene, methyl alcohol, furans, and methyl acetate.

The phenols have been the subject of a number of studies in regard to their toxicological and tumor-promoting effects. Examples of such studies will be found in U.S. National Institute of Health Bulletin No. 190, and in Cancer, volume 14, Nov.-Dec. 1961, pages 1306–1315. While the carcinogenic activity of the phenols has not been completely defined, there is evidence that the presence of the phenols in tobacco smoke is undesirable and is a serious irritant which should be removed from the smoke.

A number of different methods have been suggested for increasing the general filtration efficiency of filters as well as for decreasing specific undesirable constituents of cigarette smoke. For example, in U.S. Patent No. 2,881,-769, it is suggested that a combination of cellulose acetate filaments and finely-divided vegetable starch may be used for this purpose. In U.S. Patent No. 2,881,771, the combination of cellulose acetate fibers with particles of hydroxy ethyl cellulose, methyl cellulose, sodium carboxy methyl cellulose, or carboxy methyl cellulose is suggested. In U.S. Patent No. 2,815,761, a combination of a supporting mass and a mass of water-soluble, polymeric hydroxide was suggested. In U.S. Patent No. 2,904,050, the combination of cellulose acetate filaments and a wax is recommended. In U.S. Patent No. 2,953,-837, filament tow carrying very small amounts of a composition of mineral oil, sorbitan monolaurate and polyoxymethylene sorbitan monolaurate, is suggested for improving the physical uniformity of filters rather than for improving filtration characteristics. In U.S. Patent No. 2,968,306, the recommended filter is a combination of filaments and particles of an amino acid material, the latter being preferably in combination with a polyhydroxy organic compound such as glycol or sorbitol. In U.S. Patent No. 3,008,472, the combination of filaments and particles of powdered glucose, powdered sucrose, powdered sorbitol, or powdered alpha-methyl-D-glucoside is suggested. In U.S. Patent No. 3,032,445, the recommended smoke filter comprises a solid ethylene oxide homopolymer or copolymers thereof with lower olefin oxides. These high molecular weight polymers have molecular weights in excess of 40,000.

Many of the filtering elements mentioned above require the inclusion of solid particles. The problems with using such powdered materials are discussed in detail in the aforementioned Patent 3,008,472. The application of the additive to the filter medium is quite difficult. The powdered additives are not very strongly bonded and the additives tend to sift or dust off from the filter. This not only reduces the filter's effectiveness because of the absence of the additive, but also causes clogging of the filter as well as the additional objectionable factor of causing the additive to pass into the smoker's mouth. The patentee found it desirable to incorporate certain specific hydroscopic powders with the additives to avoid or minimize the sifting or dusting problem.

It may be seen from the foregoing that the attempts to incorporate powdery materials require the inclusion of additional relatively inert components in the cigarette filter in order to incorporate effectively the active filtering additives. It would obviously be desirable for a number of reasons to include only effective filtering materials in the smoke filtering medium and to avoid the problems encountered by the inclusion of particulate materials in the filter. In addition, a liquid can obviously be applied more uniformly than a solid, thereby ensuring more uniform filtering action and smoking characteristics.

It has now been found that the addition of normally-liquid ethers of polyhydric alcohols to tobacco filtering materials produces a filtering medium having an increased smoke filtration efficiency and an increased preferential absorbency for phenols. As employed herein, the term "normally-liquid ethers of polyhydric alcohols" designates those compounds containing an ether linkage which are in the liquid state at normal ambient conditions, i.e., room temperature, and advantageously liquid at 10° C. or even at 0° C.

One group of ethers which are useful in the present invention may be represented as ethers formed from the etherification of polyhydric alcohols with monohydric alcohols, e.g., polyalkoxy alkanes. Advantageously, the polyhydric alcohol is relatively unbranched and the monohydric alcohol is a lower alkanol, e.g., 1,2,3-trimethoxypropane and the like. Advantageously the ether has at least about 1 ether linkage per four carbon atoms and is linearly uncomplicated so as to minimize steric hindrance at the sorption site. A second group of ethers which is useful in the present invention comprises ethers formed by the condensation of polyhydric alcohols or by the addition of alkylene oxides to a compound containing an active hydrogen such as water, an acid, an amine or an alcohol. Examples of useful members of this group range from diethylene glycol and triethylene glycol up through the liquid polyethylene glycols having molecular weights of 600 and higher, the liquid polypropylene glycols, the liquid polybutylene glycols and the liquid polyoxymethylene compounds. Polyethers which are condensation products of a mixture of alkylene oxides such as ethylene oxide and propylene oxide are also useful. Ethers formed by the reaction of a polyhydric alcohol such as glycerine, sorbitol or sorbitan, with an alkylene oxide are also useful, e.g., glycerine-propylene oxide addition product. Other materials showing useful properties are the polyether-amino compounds formed by the reactions of a secondary amine, a primary amine or ammonia with an alkylene oxide.

Still another important group of compounds for use in the present invention are those which may be described as condensation products of compounds containing an active hydrogen or addition products of polyhydric alcohols and alkylene oxides in which some or all of the unreacted alcohol groups are etherified with monohydric alcohols or esterified with monocarboxylic acids. Important examples of the former are the dimethyl ethers of triethylene glycol and tetraethylene glycol as well as the alkaryl ethers of polyalkylene glycols which may be represented by the general structure

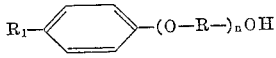

wherein R is lower alkylene, $R_1$ is hydrogen or lower alkyl, and $n$ is an integer from 2 to 30 or more. One useful, commercially available member of this group of ethers has the general structure

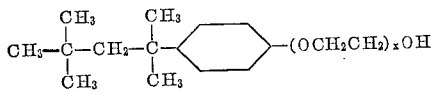

wherein $x$ can be 12 or 13. Examples of esterified compounds are polyols in which all or some of the terminal hydroxyl groups are esterified with a low molecular weight monocarboxylic acid such as formic acid, acetic acid, propionic acid or valeric acid. Since an acid can act as the initiator of an alkylene oxide polymerization, it is possible to have a different ester group at each end of the polyglycol, by esterifying the glycol polymer monoester, produced by condensing ethylene oxide with formic acid, with a higher acid such as palmitic acid. Examples of esterified compounds are tetraethylene glycol diacetate or polybutylene glycol diacetate. Another group of compounds for the purpose of this invention are internal ethers or the esters of internal ethers. Included in this group are sorbitan, sorbitan esters such as the monolaurate, monooleate, trioleate, etc., and mixtures of these polar non-ionic materials with other highly polar compounds.

The aforementioned groupings are, of course, not limiting on the normally-liquid ethers of polyhydric alcohols which are useful in the present invention. Obviously, compounds which fit in a number of the above-mentioned groups are also useful. For example, polyoxyethylene sorbitan monolaurates containing anywhere from about 4 up to about 20 oxyethylene units have been found satisfactory for the purposes of this invention. From the above teaching, other examples will suggest themselves to those skilled in the art.

The liquid additives of the present invention are suitably introduced into the filtering element on a filtering support material. Typical of such filtering support materials are rayon, polyolefins, nylon, cellulose ester fibers, cotton, paper, etc. Particularly useful materials are secondary cellulose acetate fibers and cellulose triacetate fibers such as those produced by dry spinning a solution of cellulose acetate into an evaporative atmosphere, although there could be employed as a carrier any filtering medium which presents a large surface for smoke filtration provided that the liquid materials remain partially or wholly at or near the surface in order to furnish an active site for sorption of the undesirable components from the smoke stream, e.g., silica gel, ion exchange resins, and particularly papers or paper-like products made from acetylated cellulose which themselves show phenol selectivity.

The additive may be applied in the same manner in which liquid plasticizers are added to fibers or filaments in the manufacture of cigarette filters; for example, a tow of filaments may be opened, i.e., spread, and the liquid ether additive sprayed thereon. It is also possible to feed an opened tow through a bath of the liquid ether additive and the excess liquid removed. Similarly, an opened tow may be passed over a roller applicator wherein one side of the roller dips into a bath of the liquid ether additive and the other side of the roller contacts the opened tow. The filament tow can then be formed into a filter in the usual manner. As example of this will be found in U.S. Patent No. 3,093,142 to J. Swerdloff, et al.

Another method for applying the liquid materials to fibers for filaments would be the lubricating trough at the plant in which the individual bundles of filaments from one jet are bathed with the liquid material from a rotating cylindrical applicator roll. The bundles of wetted filaments are then gathered into a band, crimped, dried and then baled. Another method of application involves condensation of vapors of the liquid materials on the carrying medium before it is made into a cigarette filter. Still another method of applying additive is to pass the opened tow over or under one or more porous or perforated rods into which the additive is pumped under pressure. Other methods of application would be use of a centrifugal applicator as explained in patent application Ser. No. 216,894. Similar application methods may be used for other filtering media.

At least about 3 weight percent of the liquid ether additive based on the dry weight of the filter should be incorporated in the filter tip for the purposes of this invention. While the exact reason is not known, the additive is substantially ineffectual in proportions less than about 3 weight percent. Above this amount, the filtration efficiency increases with increasing quantity of additive on up to about 20 weight percent. However, the preferred quantity of additive is in the range of about 5% to about 15%. The tow is preferably composed of a plurality of continuous filaments of an organic derivative of cellulose, e.g., esters or ethers of cellulose such as cellulose acetate, cellulose propionate and cellulose acetate propionate, highly esterified cellulose containing less than 0.29 free hydroxyl groups per anhydroglucose unit such as cellulose triacetate, and the like. Other filamentary materials such as rayon (regenerated cellulose), lineary superpolyamides such as nylon-6 and nylon-66, linear polyesters, and polymers and copolymers of vinylidene compounds such as ethylene, propylene, vinylidene cyanide, acrylonitrile, and the like, can also be employed. The number of filaments and the total denier can vary within wide limits, but in preparing filters for conventional cigarettes which are approximately 24 to 26 mm. in circumference, the number of filaments generally varies between about 3,000 and 40,000, and the total denier ranges from about 35,000 to 250,000, computed on uncrimped tow. The individual filament denier may range from about 1 or less to 35 or more, preferably about 2 to 25. The filaments are preferably crimped; the number of crimps per inch in the tow can range up to about 30–40, but preferably averages between about 4 and 25, e.g., 8 to 12 computed on an inch of straightened tow. The percent crimp, i.e., $$\frac{\text{tensioned length-contracted length}}{\text{contracted length}} \times 100$$

preferably ranges from about 50 to 200% and more preferably from about 75 to 150%.

In the examples which follow, the support material was secondary cellulose acetate filament tow dry spun from acetone solution and having an acetyl value of about 55% calculated as combined acetic acid by weight. The tow containing the indicated additives was made into filament rods 102 millimeters in length and 25 millimeters in circumference. These rods were then cut into 17 millimeter filters and attached to cigarettes. The resulting filter cigarettes were subjected to the indicated tests. Smoke removal efficiency of the filtering elements was determined as follows: 32 cc. puffs of 2 seconds duration are drawn from a lit cigarette 70 mm. long at a frequency of 1 per minute through the 17 mm. filter and through a glass microfiber trap which retains 99.9% of all smoke particles greater than 0.3 micron in diameter; the cigarettes are smoked to 30 mm. overall length. The formula for the smoke removal efficiency is as follows:

Percent efficiency =

$$\frac{\text{Increase in Weight of Filter}}{\text{Increase in Weight of Filter Plus Trap}} \times 100$$

The combination of firmness with resilience is important in filter plugs. In actual use filters are compressed and distorted out of shape. While the paper wrapper may rebound, often the filaments do not, so that channels are formed between the paper and the periphery of the filaments making up the plug. Moreover, pressure on a bonded filter causes only the peripheral filaments near the point of pressure application to be displaced so that smoke channels preferentially through the remainder of the filter; this is evidenced by carefully longitudinally slitting the paper wrappers of bonded and unbonded plugs. The wrapper of the plugs flies open under the force of the filaments and the cross-sectional area of the filament bundle increases to a greater or lesser amount, depending on the firmness-resilience characteristics of the filter.

Another way of establishing this is by testing the plugs for compressibility. Compressibility, the inverse of firmness, is determined utilizing a precision deadweight micrometer manufactured by Testing Machines, Inc., Model 551. The upper anvil at its highest point is 0.420 inch above the lower anvil. The rod is placed in the center of the lower anvil with the paper seam 90° from the contact point. The upper anvil is released and allowed to free fall onto the rod. The micrometer dial reading is converted to a compressibility value by consulting an empirically derived table which is dependent on the circumference of the rod. A lower value for percent compressibility indicates a firmer rod.

In the following examples, the filter plugs are made by taking the crimped tow in a bale form and withdrawing it from the bale through an air spreader mechanism in order to give a flat band of approximately 5 to 8″ width. This band is then opened by passing through two sets of rolls. The top roll in each set is a threaded steel roll. The bottom roll of each set is a hard rubber roll. These sets are driven at different speeds such that the second set of rolls is traveling at a speed approximately 1.7 times as fast as the first set. The filaments of the tow are subjected to a shuffling and crimp deregistration action by these rolls such that upon the discharge from the second set of rolls the tow is opened. The tow is then spread in another air spreader in order to form a flat band of about 12 inch width and passed through a liquid applicator housing. In the bottom of this housing a motor driven wheel of 4¾ inches diameter with 16 holes of 0.030 inch diameter in the periphery is whirling at approximately 3580 r.p.m. in a plane perpendicular to the plane of the tow. The liquid additive is pumped into the wheel and thrown through the holes by centrifugal force. The effect is that a jet of droplets are formed in a plane perpendicular to the plane of the opened tow. The tow discharges from the front of the liquid applicator housing and passes across a set of delivery rolls where the direction of motion is changed. The tow is then gathered and bunched at the trumpet of the garniture into a cylindrical shape and wrapped in a paper to give the final rod form. The continuous cylinder of tow is then automatically cut into 102 mm. lengths. The amount of liquid additive applied to the tow is controlled by adjusting the speed of the gear pumps which discharge to the center of the wheel in the liquid applicator housing. When no plasticizer or liquid additive is used, the foregoing is modified by merely stopping the pumps so that no additive is applied to the tow as it passed through the liquid applicator housing.

*Example I*

A 50,000 denier tow of 3.2 denier per fil dry-spun secondary cellulose acetate regular cross-section filaments was converted in the manner described previously into three sets of 102 mm. filter rods which were cut into 17 mm. cigarette filters. One set was free of additive and plasticizer. The second contained 12.4% triethylene glycol, $HO(CH_2CH_2O)_3H$, and 8.3% triacetin based on weight of fiber, paper and glue. The third set contained 16.2% of triethylene glycol and 8.1% triacetin. The filters were tested, with the following results:

| | | | |
|---|---|---|---|
| Percent Triethylene Glycol | None | 12.4 | 16 |
| Filter weight, g./100 rods | 84.9 | 102.2 | 105.2 |
| Tip pressure drop, mm. of $H_2O$ | 50 | 51 | 56.5 |
| Smoke removal efficiency, percent | 36 | 45 | 48 |
| Rod compressibility, percent | 30 | 19 | 21 |
| Tip compressibility, percent | 32 | 25 | 27 |

As will be noted, the additive increased the filtration efficiency substantially without seriously increasing the tip pressure drop.

*Examples 1–4*

A 50,000 denier tow of 3.2 denier per fil dry-spun secondary cellulose acetate regular cross-section filaments was converted in the manner described into 102 mm. long filter rods of 25 mm. circumference and dry weight of 72.0 grams per 100 rods. Ether additives were included in some of the rods. The rods were cut into 17 mm. filter plugs, which were tested for smoke efficiency. The results of these tests follows. All of the filters tested contained 7.8% of triacetin plasticizer.

| Ether Additive | Tip Pressure Drop mm. of $H_2O$ | Smoke Removal Efficiency, percent |
|---|---|---|
| None | 46 | 34 |
| Diethylene Glycol, percent: $HO(CH_2CH_2O)_2H$ | | |
| 6.5 | 45 | 37 |
| 9.6 | 44 | 38 |
| 15.8 | 47 | 40 |
| Polyethylene Glycol, percent: (mol. wt. 200) | | |
| 3.5 | 49 | 38 |
| 5.6 | 50 | 41 |
| 10.2 | 52 | 44 |

*Example 5*

A 60,000 denier tow of 5.0 denier per fil dry-spun secondary cellulose acetate filaments of Y cross-section was converted, in the manner described previously, into 102 mm. filter rods which were cut into 17 mm. cigarette filters. Varying amounts of triethylene glycol, but no plasticizer, were included in the filter rods. The dry weight of the rods was 90.8 grams per 100 rods. The filters were subjected to the previously-described filtration tests with the following results:

| Percent Triethylene Glycol | Tip Pressure Drop, mm. of $H_2O$ | Smoke Removal Efficiency, percent |
|---|---|---|
| None | 52 | 35 |
| 4.2 | 54 | 38 |
| 6.0 | 55 | 39 |
| 9.9 | 55 | 42 |
| 11.8 | 57 | 43 |

While overall filtration efficiency is an important consideration in evaluating the effectiveness of a tobacco smoke filter, there is a practical limit after which point either the filter pressure drop is excessive or desired components are removed, or both. Thus, the overall filtration efficiency of a filter may actually be decreased by an additive or other treatment and yet the filter be an improvement over more efficient filters; this may result from the increased selectivity of the filter for specific, undesirable components. As was discussed previously, the phenols have been found to be disagreeable and undesirable components. The filters of the present invention exhibit a selectivity for phenols as well as an increase in overall filtration efficiency; even in cases where overall filtration efficiency decreases, the additives of the present invention provide a high selectivity for phenols.

In the following examples, the specified filters were subjected to smoking tests to determine the quantitative removal of the phenol from the smoke by the filter. A test smoking machine of the type described in "Tobacco Science," I, 57 (1957), was used. The six smoking ports on the machine were set to deliver a 32 cc. puff volume of 2 seconds duration with one puff every 58 seconds. Particulate matter in the smoke stream is collected in a filter trap having a filter pad constructed of glass micro fibers held together with an acrylic binder. The pad is inserted in a two-piece Lucite holder with the cigarettes held in front of the holder by a latex sleeve; a full description of the holder will be found in "Analytical Chemistry," 31, 1705 (1959).

Thirty regular cigarettes, each 70 mm. long, weighing 1.040±0.020 grams, are selected, conditioned at 74° F. and 60% relative humidity, and smoked on the smoking machine. A 57 mm. column of tobacco is smoked for the tests. Six cigarettes are inserted into the latex sleeves of the filter traps, lighted, and the smoking cycle begun. When the cigarette flame has advanced to a mark indicating that the correct amounts of tobacco has been burned, the flame is pinched out and an additional puff drawn through the butt and the trap. The butt is then removed from the latex sleeve and another cigarette immediately inserted and lit. The procedure is duplicated until five cigarettes have been smoked through each trap. After the last cigarette has been smoked, the traps are immediately dismantled and the filter pads removed with tweezers and placed in a 500 ml. glass stoppered reagent bottle containing 100 ml. of 2 Normal sodium hydroxide. The pads are completely submerged below the surface of the caustic solution. The smoke condensate solution is stored in a refrigerator and analyzed as soon as possible.

Appropriate amounts of internal standards (o-chlorophenol; 3,4,5-trimethyl phenol) are added to the sodium hydroxide solution containing the collection pads. The collection pads are transferred to a 300 ml. fritted glass funnel and filtered under suction. The container and pads are washed with four additional 25 ml. portions of 2 Normal sodium hydroxide. Excess sodium hydroxide is removed from the filter pads by pressing them with the bottom of a clean 50 ml. beaker. The collected filtrate is removed from the filter flask, transferred to a 500 ml. separatory funnel and extracted with four 25 ml. portions of ether. The basic solution is cooled to approximately 0° C. in an ice bath and carefully acidified with 60 ml. of 20% $H_2SO_4$. The phenols are extracted from the acid solutions using five 40 ml. portions of reagent grade diethyl ether. The combined ether extracts are washed with four 50 ml. portions of saturated sodium bicarbonate to remove strongly acidic components. The phenols are extracted from the ether solutions with five 40 ml. portions of 2 Normal sodium hydroxide and the extraction cycle repeated; i.e., acidify basic solution, extract with ether and wash with saturated sodium bicarbonate. The ether solution is evaporated to a volume of 1 ml. under slightly reduced pressures and transferred to a 2 ml. vial and sealed with a rubber septum. The sample is then ready for gas chromatographic analysis.

The gas chromatograph used for the analysis of the phenolic fraction of cigarette smoke was equipped with a flame ionization detector.

All areas on the chromatograms were integrated by means of an integrator which automatically monitors the recorder output and electronically converts and prints out relative unbalance of a bridge type circuit.

The concentration of phenol in cigarette smoke condensates was calculated by means of calibration curves and the following equation:

$$\text{Micrograms phenol/cigarette} = \frac{Rc \times W}{N}$$

where
$Rc$ = Weight phenol/weight internal standard (value read directly from calibration curve).
$W$ = Micrograms of internal standard added.
$N$ = Number of cigarettes smoked to produce the sample.

Using the aforementioned procedure the phenol delivery of a number of filter samples was treated. By comparing the phenol delivery of filters in which no additive was incorporated with the phenol delivery of the filters to which the different liquid polyalkylene glycols and related derivatives were added, it was possible to determine the effective phenol removal due to the additions of the aforementioned materials. The results of these tests will be found in the following examples. The phenol delivery quantities shown in the examples are based on a 57 mm. column of tobacco. For these examples, 17 mm. filter tips were attached to standard cigarettes; the tips were made from 102 mm. filter rods which had been processed from cellulose acetate filament tow, having a denier of about 68,000 and comprising filaments of X cross-section of 4.2 denier per filament. The dry rod weight of the filters was 99.5±1.5 grams per 100 rods. Filters corresponding to those of Examples 6 through 21 but containing no additive or plasticizer, had a smoke removal efficiency of approximately 38%, delivered 37 micrograms of phenol per cigarette, to give a phenol removal efficiency of approximately 63%.

*Examples 6–11*

Polyethylene glycol having a molecular weight of from 200 to 600 was added to the previously described tow in varying amounts. Filter tips made therefrom were tested for phenol delivery with the following results:

| Ex. | Molecular Weight | Additives, Gms./100 Rods | Phenol Delivery, µg./Cigarette |
|---|---|---|---|
| 6 | 200 | 3.4 | 23 |
| 7 |  | 4.8 | 22 |
| 8 |  | 12.3 | 13 |
| 9 | 400 | 4.7 | 21 |
| 10 |  | 14.6 | 13 |
| 11 | 600 | 10.7 | 12 |

*Example 12*

Liquid polypropylene glycol having a molecular weight of 1200 was added to the tow of the type previously described in an amount of about 13.5 grams per 100 filter rods. The phenol delivery of the resulting filter was 10 micrograms per cigarette.

*Examples 13–15*

The dimethyl ether of triethylene glycol was added to the tow of the type previously described in varying amounts, filters were made therefrom and tested for phenol delivery. The results were as follows:

| Ex. | Additives, Gms./100 Rods | Phenol Delivery, µg./Cigarette |
|---|---|---|
| 13 | 5.2 | 21 |
| 14 | 9.5 | 21 |
| 15 | 15.9 | 11 |

*Examples 16–19*

The dimethyl ether of tetraethylene glycol was added to the tow of the type previously described in varying amounts, filters were made therefrom and the filters tested for phenol delivery. The results were as follows:

| Ex. | Additives, Gms./100 Rods | Phenol Delivery, µg./Cigarette |
|---|---|---|
| 16 | 2-4 | 23 |
| 17 | 4.8 | 20 |
| 18 | 7.1 | 15 |
| 19 | 16.0 | 10 |

Example 20

A liquid dialkoxy ether of a polypropylene glcyol having an average molecular weight of about 600 and produced by a polymerization reaction in which propylene oxide is a major reactant, known commercially as Ambiflo C–16, a product of Dow Chemical Company, was added to the tow of the type previously described to provide a filtering product containing about 9.5 grams of additive per 100 rods. The phenol delivery of the resulting product was 10 micrograms per cigarette.

Example 21

A liquid polyoxypropylene-glycerine copolymer (NIAX Triol–LG–56) having an average molecular weight of about 3000 was added to the tow of the type previously described in an amount to provide a filter product containing 14.9 grams per 100 rods. The phenol delivery of the resulting filter was 14 micrograms per cigarette.

The filters in Examples 22 through 28 were made from a cellulose acetate filament tow having a total denier of 60,000, and comprising regular cross-section filaments of 2.5 d.p.f. The dry rod weight of these 102 mm. rods was 91.0±0.5 gms. per 100 rods. Filters of 17 mm. length were cut from these rods; the filters containing no additive or plasticizer had a smoke removal efficiency of approximately 47% and delivered approximately 32 micrograms of phenol per cigarette.

Example 22

Liquid polyoxyethylene (20) sorbitol was added to the opened tow in an amount to provide a filtering product containing 5.9 grams of additive per 100 rods. The phenol delivery of the resulting product was 19 micrograms per cigarette.

Example 23

The opened tow was treated with 13.0% of polyoxyethylene(4)lauryl ether. The filters gave a phenol delivery of 7.9 micrograms per cigarette. The filtration efficiency was about 43%.

Example 24

The opened tow was treated with 15.9% of polyoxyethylene(20)sorbitan monolaurate. The filters gave a phenol delivery of 7.7 micrograms per cigarette. The filtration efficiency was 45%.

Example 25

The opened to was treated with 14.8% of polyoxyethylene(4)sorbitan monolaurate. The filters gave a phenol delivery of 14.8 micrograms per cigarette. The filtration efficiency was about 45%.

Example 26

Example 25 was repeated except that the additive was 15.7 weight percent of sorbitan monolaurate. The phenol delivery of the resulting product was 13.9 milligrams per cigarette. The phenol removal efficiency was about 46%.

Example 27

Example 25 was repeated except that the additive was 14.1 weight percent of sorbitan monooleate. The phenol delivery of the resulting product was 19.3 milligrams per cigarette. The filtration efficiency was about 44%.

Example 28

Example 25 was repeated except that the additive was 15.4 weight percent of sorbitan trioleate. The phenol delivery of the resulting product was 20.7 milligrams per cigarette. The filtration efficiency was about 40%.

As will be noted by comparing the data of the examples with the data for filters without additive, while the overall filtration efficiency is increased by the additives, the phenol selectivity is generally increased even more.

Triacetin, a common plasticizer for cellulose acetate, has been found to give low phenol deliveries comparable to those with the additives of the present invention. However, surprisingly, the phenol removal characteristics of triacetin decrease to a great extent over a period of time; much of the phenol removal efficiency of triacetin is lost in 4 to 6 weeks. However, when the ether additives of the present invention are incorporated in filters either with or without triacetin, the smoke removal efficiency and phenol removal efficiencies remain substantially constant even after 10 weeks of storage. Since the additive is normally included in the filter rod a substantial period prior to delivery to cigarette manufacturers and prior to manufacture into cigarette and other tobacco smoke filtration products, and since the final products will then be stored substantial periods of time before ultimate use by the consumer, the shelf-life of the filter insofar as filtration effectivenesses is concerned is of considerable significance.

It has also been found advantageous in a number of circumstances to omit plasticizer from tobacco smoke filters. This is discussed, in detail, in U.S. patent application Ser. No. 265,518, which is assigned to the assignee of the subject application. Thus, the nonplasticizing ethers of the present invention will be found particularly useful in these applications for increasing the filtration efficiency and the phenol removal by the non-bonded filters. Most of the ethers described herein, and particularly those represented by the condensation product of polyhydric alcohols or by the addition products of a polyhydric alcohol and an alkylene oxide, are inert, i.e., nonplasticizing, to cellulose acetate and to most of the fibers useful herein. All of the ethers described herein will be found useful as additives to filtering media which are not subject to plasticization. For plasticized filters, the ethers of the present invention will increase the smoke filtration efficiency and the phenol removal and will serve to maintain the efficiencies of filtration and phenol removal at high levels for extended periods of time, even after the effect of the plasticizer on these properties has begun to diminish.

It has also been found that of the groups of ethers exhibiting plasticizing properties for cellulose esters, particularly for cellulose acetates, one group is superior even to triacetin, viz. the monohydric alcohol ethers of polyalkylene glycols.

In particular, the dimethyl ethers of the polyethylene glycols containing from about 3 up to about 20 ethoxy groups are useful plasticizers for the cellulose acetates. They can be applied as plasticizers in the same manner as triacetin. However, whereas filter rods bonded with triacetin must be allowed to age for about 2 hours and are normally aged for 4 hours before they are assembled into filter cigarettes, filter rods bonded with the polyalkylene glycol ethers are set up by the time they leave the rod-making equipment. Thus, the use of such polyalkylene glycol ethers allows a continuous rod-making and cigarette assembly operation without the necessity for extended aging periods. When it is further considered that these polyethylene glycol ethers have equivalent over-all smoke removal efficiency, pressure drop, and phenol removal ability to triacetin, and in addition have good shelf-like insofar as these desirable properties are concerned, the superiority of these ethers is apparent. In general, the ethers can be used in quantities which are comparable to those used with triacetin, i.e., 3 to 10% and higher and preferably about 5 to 15%. For bonded cellulose acetate filamentary filter plugs, the dimethyl ethers of tri or tetraethylene glycols are preferred.

In all of the foregoing examples, the ethers were used individually. It is, of course, possible to use various combinations of the ethers for further enhanced results. For example, a 50–50 mixture of polyethylene(4)lauryl ether and sorbitan monolaurate applied to the same rods used in Examples 22 to 28 at a 15% addition level delivered 6.7 micrograms of phenol/cigarette, and ⅓–⅓–⅓ mixture of the above compounds and polyoxyethylene(20)

sorbitan monolaurate at 15% addition level delivered 6.5 micrograms phenol/cigarette.

It is to be understood that the foregoing detailed description is given merely by way of illustration and that many variations may be made therein without departing from the spirit of our invention.

The embodiments of the invention in which an exclusive property or privilege is claimed are defined as follows:

A tobacco smoke filter comprising a supporting mass adapted to afford passage of tobacco smoke therethrough, said mass including from about 3% to about 20% by weight of said mass of a normally liquid ether of a polyhydric alcohol, said ether selected from the group consisting of the dimethyl ether of triethylene glycol and the dimethyl ether of tetraethylene glycol.

References Cited

UNITED STATES PATENTS

| | | | |
|---|---|---|---|
| 2,904,050 | 9/1959 | Kiefer et al. | 131—208 |
| 2,943,737 | 7/1960 | Norton. | |
| 3,026,226 | 3/1962 | Touey et al. | 131—208 |
| 3,227,791 | 1/1966 | Kiefer et al. | 131—267 X |

FOREIGN PATENTS

| | | |
|---|---|---|
| 173,262 | 12/1952 | Austria. |
| 209,783 | 6/1960 | Austria. |

SAMUEL KOREN, *Primary Examiner.*

MELVIN D. REIN, *Examiner.*